United States Patent [19]

Chijiishi et al.

[11] Patent Number: 4,505,659
[45] Date of Patent: Mar. 19, 1985

[54] APPARATUS FOR MANUFACTURING A CONTINUOUS SLIDE FASTENER STRINGER

[75] Inventors: Toshio Chijiishi, Namerikawa; Hiroshi Matoba, Toyama; Kazuo Nakamura, Uozu; Toshiaki Higuchi, Kurobe, all of Japan

[73] Assignee: Yoshida Kogyo K.K., Tokyo, Japan

[21] Appl. No.: 556,105

[22] Filed: Nov. 29, 1983

[30] Foreign Application Priority Data

Nov. 30, 1982 [JP] Japan .................. 57-210296

[51] Int. Cl.³ .................. B29D 5/00; B29D 3/00; B29F 1/00
[52] U.S. Cl. .................. 425/121; 264/40.1; 425/126 R; 425/129 R; 425/137; 425/150; 425/814
[58] Field of Search .......... 425/110, 111, 121, 126 R, 425/129 R, 814, 135, 145, 150; 264/40.1

[56] References Cited

U.S. PATENT DOCUMENTS

| | | | |
|---|---|---|---|
| 4,222,723 | 9/1980 | Sawada | 425/814 |
| 4,226,577 | 10/1980 | Sawada | 425/814 |
| 4,336,220 | 6/1982 | Takahashi | 425/814 |
| 4,362,487 | 12/1982 | Takahashi | 425/129 R |

FOREIGN PATENT DOCUMENTS

53-31441 3/1978 Japan .
51326 5/1981 Japan .................. 425/121

Primary Examiner—Willard E. Hoag
Attorney, Agent, or Firm—Hill, Van Santen, Steadman & Simpson

[57] ABSTRACT

An apparatus for manufacturing a continuous slide fastener stringer, including a plurality of longitudinally spaced rows of injection-molded coupling elements secured to a stringer tape along a longitudinal edge thereof with a plurality of element-free portions between the successive rows of the injection-molded coupling elements, includes a fixed feeler disposed on one of a pair of relatively movable mold members adjacent to a leading mold cavity therein for detecting a trailing end of the injection-molded coupling elements, and a movable feeler disposed on the one mold member downstream of the fixed feeler at a distance substantially equal to the length of the element-free portions of the stringer. The movable feeler is driven by a driving mechanism to selectively project or retract from a mold surface of the one mold member in interlocking relation with a feed mechanism which intermittently feeds the stringer tape by a predetermined distance.

3 Claims, 11 Drawing Figures

APPARATUS FOR MANUFACTURING A CONTINUOUS SLIDE FASTENER STRINGER

BACKGROUND OF THE INVENTION

1. Field of the Invention

The present invention relates to a method of and an apparatus for manufacturing a continuous slide fastener stringer including a plurality of longitudinally spaced rows of injection-molded coupling elements molded to a stringer tape along a longitudinal edge thereof with a plurality of element-free portions between the successive rows of coupling elements.

2. Prior Art

A typical example of such apparatus as described is disclosed in Japanese Patent Laid-Open Publication (Kokai) No. 53-31441 published Mar. 24, 1978. According to the disclosed apparatus, a precise positioning of an end of a row of injection-molded coupling elements with respect to a series of mold cavities is difficult to achieve with the result that element-free portions between successive rows of injection-molded coupling elements vary in length. A continuous slide fastener stringer having such uneven element-free portions is not suitable for being subjected to succeeding processes such as end-stop application, automatic pairing with a mating stringer, and severing.

SUMMARY OF THE INVENTION

An apparatus for securing a plurality of longitudinally spaced injection-molded coupling elements to a continuous stringer tape along a longitudinal edge thereof with a plurality of element-free spaces between the successive rows of injection-molded coupling elements, includes a fixed feeler disposed on the one of a pair of relatively movable mold members adjacent to a leading mold cavity in the one mold member, and a movable feeler disposed on the one mold member downstream of the fixed feeler at a distance substantially equal to the length of the element-free portions of the stringer, both feelers serving to detect a trailing end of the injection-molded coupling elements. The movable feeler is driven by a driving mechanism to selectively project or retract from a mold surface of the one mold member in interlocking relation with a feed mechanism which intermittently feeds the stringer tape by a predetermined distance. The length of each row of injection-molded coupling elements can be changed by projecting the feeler from the mold surface when the feed mechanism completes a predetermined number of feedings of the stringer tape.

It is therefore an object of the present invention to provide a method of and an apparatus for manufacturing a continuous slide fastener stringer including a plurality of rows of injection-molded coupling elements secured to a continuous stringer tape along a longitudinal edge with a plurality of element-free portions of a uniform length between the successive rows of the injection-molded coupling elements.

Another object of the present invention is to provide a method and an apparatus by which the rows of injection-molded coupling elements of varying length are formed on a continuous stringer tape.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1:
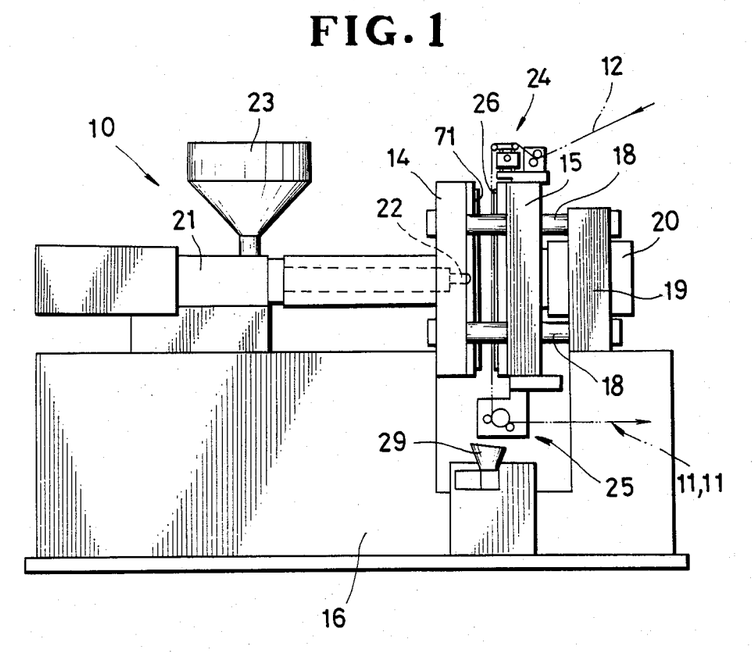
FIG. 1 is a schematic front elevational view of an apparatus embodying the present invention.
Figure 10:
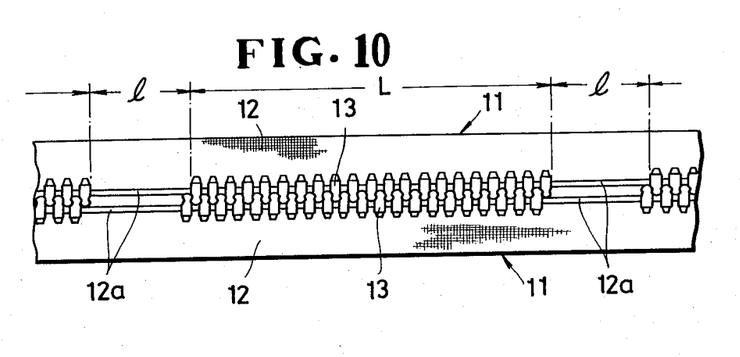
FIGS. 10 and 11 are enlarged fragmentary plan views of different slide fastener stringers manufactured by the apparatus of FIG. 1.
Figure 11:
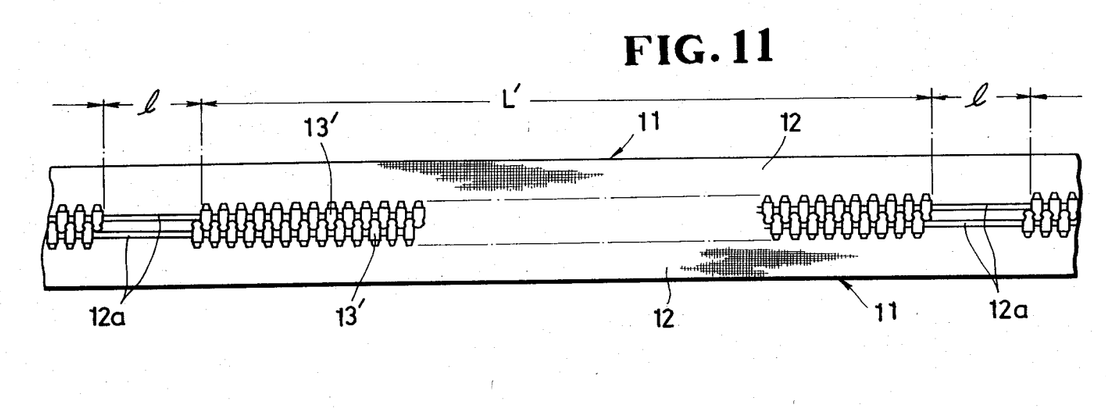

FIG. 1 shows an apparatus 10 for manufacturing a pair of continuous slide fastener stringers 11, 11 (only one of which is described here for clarity) each including a stringer tape 12 and a plurality of longitudinally spaced rows of injection-molded coupling elements 13 (FIG. 2) secured to the stringer tape 12 along a longitudinal edge therof. As shown in FIG. 10, each slide fastener stringer 11 manufactured by the apparatus 10 includes the rows of injection-molded coupling elements 13 having a predetermined length L and spaced from one another by a plurality of element-free portions 12a having a length l. Alternatively, as shown in FIG. 11, the slide fastener stringer 11 may have rows of injection-molded coupling elements 13' each having a length L' which is an integral multiple of the length L of each row of the injection-molded coupling elements 13 of FIG. 10.

The apparatus 10 comprises a pair of relatively movable mold halves or members 14, 15 supported on the frame 16 and defining a predetermined number of mold cavities 17 (FIGS. 6-9), and means (described below) disposed both upstream and downstream of the mold members 14, 15 for intermittently advancing successive parts of the stringer tape 12 through the mold members 14, 15. The mold member 14 is fixed on the frame 16 while the mold member 15 is slidably mounted on a pair of tie rods 18 extending horizontally between the fixed mold member 14 and an upstanding support 19 fixed on the frame 16. An actuator or fluid-actuated cylinder 20 is mounted on the support 19 and is operatively connected to the movable mold member 15. Thus, the movable mold 15 slides on the tie rods 18 toward and away from the fixed mold member 14 upon energization and de-energization of the cylinder 20. The frame 16 also supports thereon an injector 21 having a nozzle 22 opening to a sprue (not shown) in the fixed mold member 14 for injecting melted synthetic resin material into the mold cavities 17, while the mold members 14, 15 are fully closed. A hopper 23 is mounted on the injector 21 for supplying the latter with solid synthetic resin material.

The apparatus 10 further comprises a pair of upper and lower tape shifters 24, 25 respectively disposed upstream and downstream of the movable mold member 15 for moving one of the successive portions parts of the stringer tape 12 between a first position (FIGS. 7 or 9) in which the portion of the stringer tape 12 lies on a mold suface 26 of the movable mold member 15 and a trailing end of the previous injection-molded coupling elements 13 is engageable with a feeler (described below), and a second position (FIG. 2) in which the stringer tape's portion is spaced from the mold surface 26 by a predetermined distance (described below). Gate portions 27 and a runner portion 28 (both shown in FIGS. 6 and 8) of the injection-molded coupling elements 13 are removed and then fall into a hopper 29 disposed below the movable mold member 15, as the stringer tape 12 passes through the lower tape shifter 25.

Figure 2:
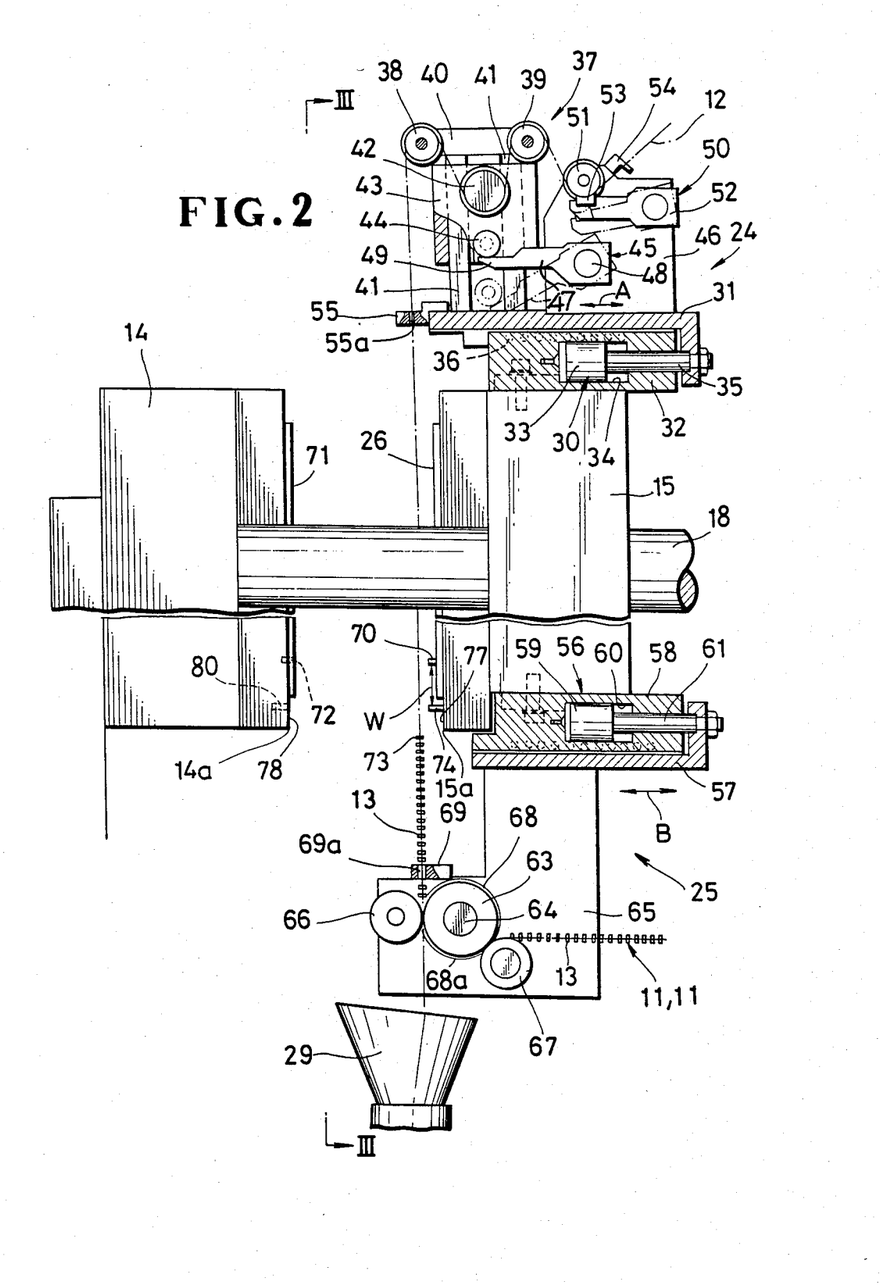
FIG. 2 is an enlarged fragmentary front elevational view, partly in cross section, of a portion of the apparatus of FIG. 1.
Figure 3:
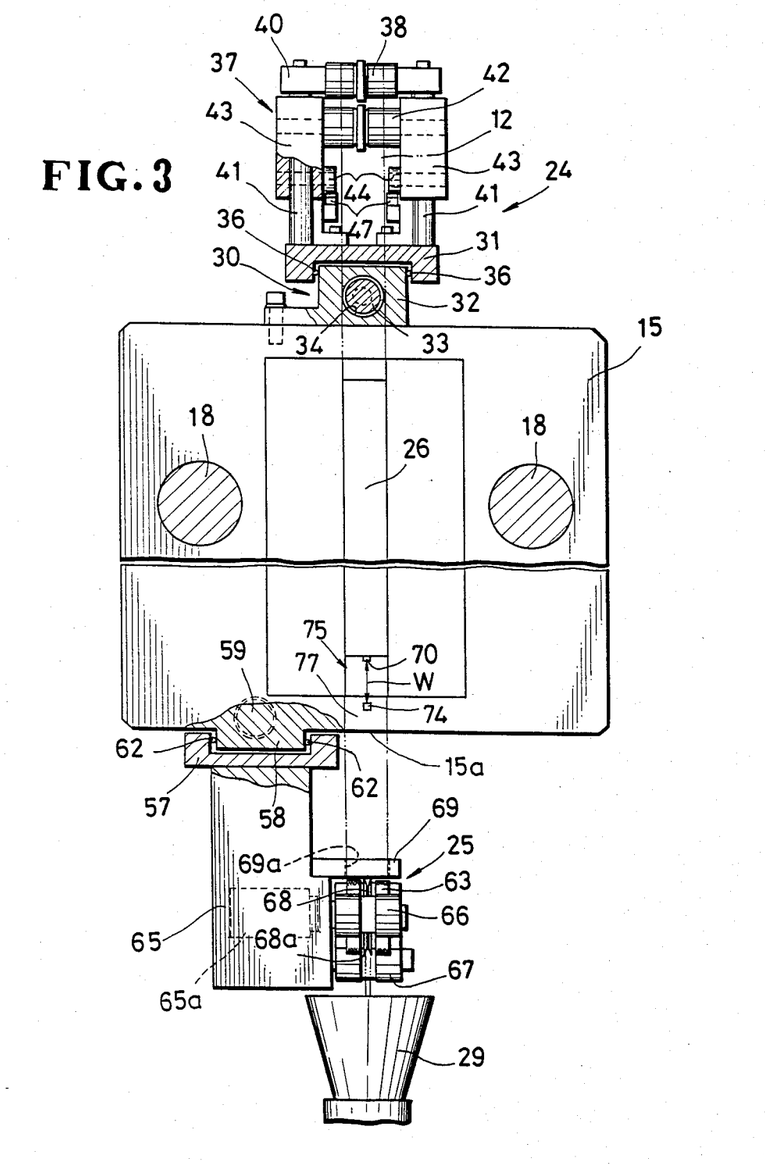
FIG. 3 is a cross-sectional view taken along line III—III of FIG. 2.

As shown in FIG. 2 and 3, the upper tape shifter 24 includes an actuator 30 mounted on the movable mold member 15, and a base 31 operatively connected to the actuator 30 and movable relative to the movable mold member 15 in opposite directions indicated by the arrowheads A (FIG. 2) upon operation of the actuator 30. More specifically, the actuator 30 comprises a fluid-actuated cylinder including a cylinder block 32 secured to an upper end of the movable mold member 15, a piston 33 movable within a cylinder bore 34, and a piston rod 35 connected at one end to the piston 34 and at the opposite end to the base 31. The base 31 is slidably mounted on the cylinder block 32 via a set of linear-motion bearings 36.

The stringer-tape advancing means includes tensioning means 37 disposed upstream of the movable mold member 15 for supporting the stringer tape 12 with a constant tension. The tensioning means 37 includes a pair of horizontally spaced guide rolls 38, 39 rotatable on a horizontal bracket 40 supported on upper ends of a pair of vertical guide posts 41, and a rotatable tension roll 42 hung on the stringer tape 12 between the guide rolls 38, 39. The tension roll 42 is rotatably mounted on a support 43 slidably mounted on the guide posts 41. The tension roll 42 and the support 43 are thus movable between a raised position (FIGS. 2 and 3) and a lowered position, keeping the tension of the stringer tape 12 constant. The tension roll 42 moves the stringer tape 12 in the reverse direction as it moves downwardly by its own weight. A roller 44 is mounted on the support 43 below the tension roll 42.

A roll holder 45 for holding the tension roll 42 selectively in its raised or lowered position is mounted on a vertical bracket 46 supported on the base 31. The holder 45 includes a holding lever 47 fixed to a horizontal shaft 48 pivotably mounted on the bracket 46, the lever 47 having a distal end 49 supporting thereon the roller 44. The shaft 48 is driven by a suitable drive means (not shown) to angularly move the lever 47 between a holding position (solid line in FIG. 2) and a releasing position (phantom line in FIG. 2) with the roller 44 carried on the lever 47. Thus, the support 43 and hence the tension roll 42 is selectively held in its raised or lowered position.

As shown in FIG. 2, a braking device 50 is disposed upstream of the tensioning means 37 for applying a braking force to the stringer tape 12. The braking device 50 includes a guide roll 51 rotatable on the bracket 46 for guiding the stringer tape 12 therearound, and a brake lever 52 rockably supported at one end thereof on the bracket 46 and having at the opposite end a brake shoe 53. Upon clockwise rocking movement of the braking lever 52, the brake shoe 53 and the guide roll 51 lock the stringer tape 12 extending therebetween. A tape guide 54 is mounted on the bracket 46 for guiding the stringer tape 12 to the guide roll 51. Another tape guide 55 is mounted on the base 31 between the guide roll 38 and the mold members 14, 15. The tape guide 55 has a vertical guide slot 55a extending parallel to the mold surface 26 for the passage therethrough of the stringer tape 12.

As shown in FIG. 2 and 3, the lower tape shifter 25 includes an actuator 56 mounted on the movable mold member 15, and a base 57 operatively connected to the actuator 56 and movable relative to the movable mold member 15 in opposite directions indicated by the arrowheads B (FIG. 2) upon operation of the actuator 56. More specifically, the actuator 56 comprises a fluid-actuated cylinder including a cylinder block 58 secured to a lower end 15a of the movable mold member 15, a piston 59 movable within a cylinder bore 60, and a piston rod 61 connected at one end to the piston 59 and at the opposite end to the base 57. The base 57 is slidably mounted on the cylinder block 58 via a set of linear-motion bearings 62.

The stringer-tape advancing means further includes a drive roll 63 fixed to a drive shaft 64 rotatably mounted on a vertical bracket 65 depending from the base 57. The drive shaft 64 is driven to positively rotate the drive roll 63 in opposite directions by a suitable drive means such as a servomotor 65a of which a number of revolutions per minute can be accurately controlled by, for example, a pulse encoder (not shown). A pair of spaced pinch rolls 66, 67 presses the stringer tape 12 against the periphery of the drive roll 63 to move the stringer tape 12.

A disc cutter 68 is secured to the shaft 64 and has a cutting edge 68a projecting beyond the periphery of the drive roll 63. The cutter 68 thus severs the gate portions 27 and the runner portion 28 of the injection-molded couping elements 13 as the stringer tape 12 passes between the rolls 63, 66. The gate and runner portions 27, 28 thus removed fall into the hopper 29.

A stringer guide 69 is disposed immediately above the nipping point between the feed roll 63 and the pinch roll 66. The stringer guide 69 has a vertical guide channel 69a extending in alignment with the guide slot 55a in the tape guide 55 for the passage therethrough of the slide fastener stringer 11 so that the stringer tape 12 extends parallel to the mold surface 26 between the guides 55, 69.

As shown in FIGS. 6–9, a feeler 70 is fixedly disposed on the movable mold member 15 adjacent to the lowermost (leading) mold cavity 17a, and projects from the mold surface 26 toward a mating mold surface 71 (FIG. 1) on the fixed mold member 14. The fixed mold member 14 has an opening 72 for receiving the feeler 70 when the mold members 14, 15 are fully closed. The feeler 70 engages the trailing end couping element 73 to stop reverse feeding of the stringer tape 12 by the rolls 63, 66 as described below. This feeler 70 is positioned such that the injection-molded coupling elements 13 have a uniform element pitch across two successive rows of such injection-molded coupling elements 13.

Another feeler 74 is movably disposed on the movable mold member 15 below the fixed feeler 70 at a distance W which is substantially the same as the length l of the element-free portion 12a (FIGS. 10 and 11). The feeler 74 is received in a hole 74a (FIGS. 4 and 5) extending in the mold member 15 perpendicularly to the guide surface 77 and opening at one end to the guide surface 77. Each mold surface 26, 71 is recessed at 75, 76 (FIG. 7) to form such a guide surface 77, 78 extending between the fixed feeler 70 and the lower end 14a, 15a of the mold member 14, 15 for supporting thereon the injection-molded coupling elements 13. Each of the recesses 75, 76 has a depth and a width which are substantially the same as or slightly larger than the depth and the width of the mold cavities 17, respectively. The feeler 74 is moved by a driving mechanism 79 (FIGS. 4 and 5) to project from the guide surface 77 and to retract into the hole 74a. The fixed mold member 14 has an opening 80 extending in the guide surface 78 in alignment with the hole 74a for receiving a portion of the feeler 74 projecting from the guide surface 77 when the mold members 14, 15 are fully closed.

Figure 4:
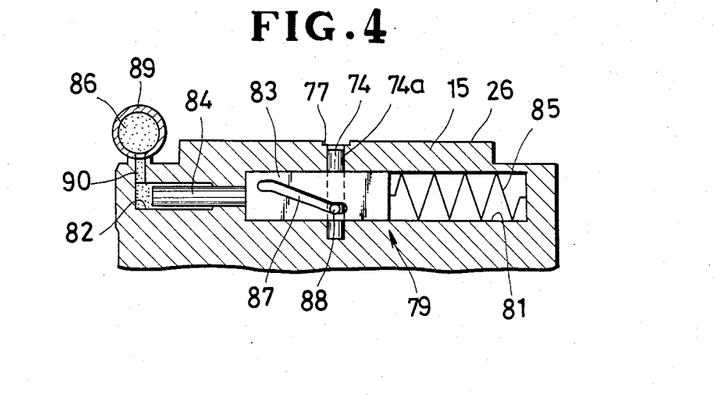
FIG. 4 is a cross-sectional view of a feeler-driving mechanism showing a movable feeler in a retacted position.
Figure 5:
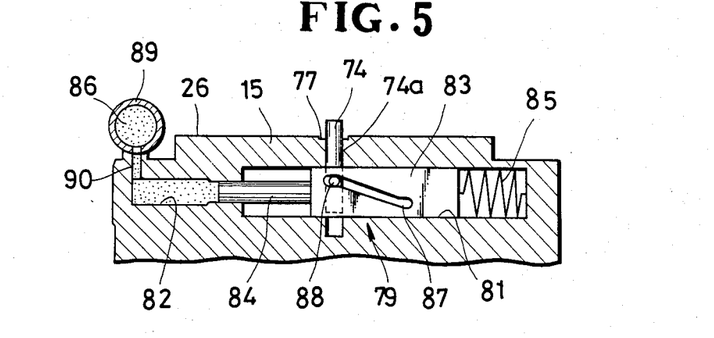
FIG. 5 is a view similar to FIG. 4, showing the feeler in a projected position.

As shown in FIGS. 4 and 5, the feeler-driving mechanism 79 includes an elongated cam chamber 81 defined in the movable mold member 15 below the guide surface 77 and extending across the hole 74a, a stepped cylinder bore 82 defined in the mold member 15 and communicating at a small-diameter portion with the cam chamber 81, a slide block 83 movably received in the cam chamber 81, a piston 84 movably received in the cylinder bore 82 and connected at one end to the slide block 83, and a compression spring 85 disposed in the cam chamber 81 remotely from the piston 84 and urging the slide block 83 toward the cylinder bore 82. When a pressurized fluid 86 is blocked against flowing into the cylinder bore 82, the slide block 83 is urged by the force of the compression spring 85 against an end of the cam chamber 81 adjacent to the cylinder bore 82, as shown in FIG. 4. The slide block 83 is moved toward the opposite end of the cam chamber 81 against the bias of the spring 85 when the pressurized fluid 86 is introduced into the cylinder bore 82 to act on the piston 84, as shown in FIG. 5. The slide block 83 has an elongate guide slot 87 extending obliquely in a direction away from the guide surface 77. The feeler 74 has a lateral pin 88 extending perpendicularly therefrom and received in the guide slot 87 in the slide block 83. A pipe or condit 89 is disposed on the movable mold member 15 and is connected at one end to a source (not shown) for supplying the pressuized fluid 86 into the cylinder bore 82 via a passage 90 extending between the condit 89 and the cylinder bore 82. Thus, the feeler 74 is fully retracted into the hole 74a when the slide block 83 is brought into the position of FIG. 4 upon blocking the flow of the pressurized fluid 86 into the cylinder bore 83. Upon introduction of the pressurized fluid 86 into the cylinder bore 83, the feeler 74 partially projects from the mold surface 77 as the slide block 83 is moved to the position of FIG. 5.

The servomotor 65a (FIG. 3) is controlled to rotate the drive roll 63 a predetermined number of revolutions, thereby feeding the stringer tape 12 by a distance which is substantially the same as the length L (FIG. 10) of each row of injection-molded coupling elements 13, 13'. The feeler-driving mechanism 79 is actuated by a controller (not shown) such that the feeler 74 projects from the guide surface 77 upon completion of the predetermined number of revolutions by the drive roll 63, and retracts into the hole 74a in response to the movement of the movable mold member 15 away from the fixed mold member 14.

The fluid-actuated cylinders 30, 56 have the same stroke which is larger than the length of portions of the respective feelers 70, 74 projecting from the mold surface 26, and are operative in synchronism with each other to extend or retract their piston rods 35, 61 at the same time.

The apparatus 10 operates as follows. For purposes of illustration, the operation begins from the condition shown in FIG. 2 in which the movable mold member 15 is held in the fully opened position; after the drive roll 63 has completed a predetermined number of revolutions to advance the stringer tape 12 by a predetermined distance, the advancing movement of the stringer tape 12 is stopped with the trailing end 73 of the previous injection-molded coupling elements 13 disposed slightly beyond the movable feeler 74; the feeler 74 is actuated by the driving mechanism 79 to project from the guide surface 77 upon completion of the drive roll's rotation; the tension roll 42, which has been moved upwardly under an increased tape tension during the advancing movement of the tape 12, is held in its raised position by the holding lever 47 which has been actuated to angularly move from the releasing position (phantom line) to the holding position (solid line) simultaneously with the stoppage of the tape feed; and the brake lever 52 is actuated to pivot in the clockwise direction simultaneously with the stoppage of the tape feed to thereby lock the stringer tape 12 betweeen the guide roll 51 and the brake shoe 53.

In response to the stoppage of the tape feed, a detector (not shown) sends a signal to the actuators 30, 56 whereupon the actuators 30, 56 are energized to simultaneously retract (or move rightward) the bases 31, 57 of the upper and the lower tape shifters 24, 25 so that a length of the stringer tape 12 is forced by the guides 55, 69 to lie flatwise on the molding surface 26 of the movable mold member 15. Simultaneously, the movable mold member 15 is moved toward the fixed mold member 14 by the cylinder 20 energized by a signal from the detector.

Figure 6:
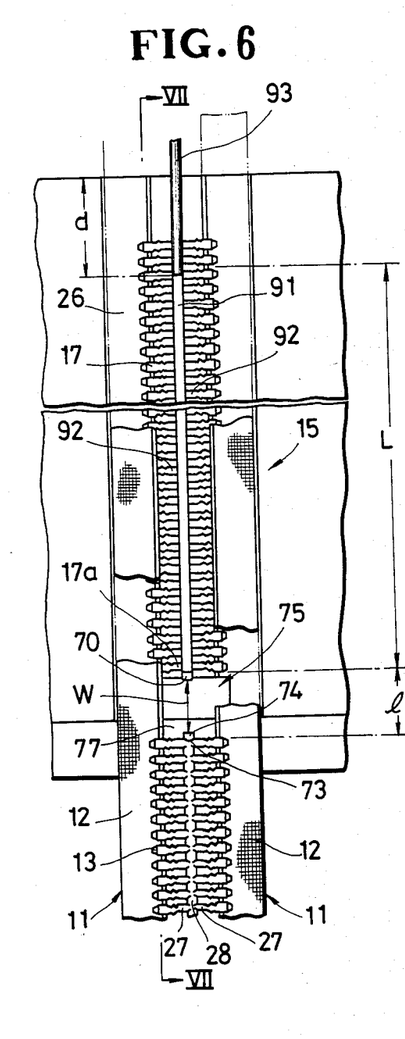
FIG. 6 is an enlarged fragmentary view of a movable mold member with a pair of slide fastener stringers, showing the manner in which a pair of longitudinally spaced rows of injection-molded coupling elements are formed on each stringer tape along an inner longitudinal edge thereof with an element-free portion between the rows of coupling elements.
Figure 7:
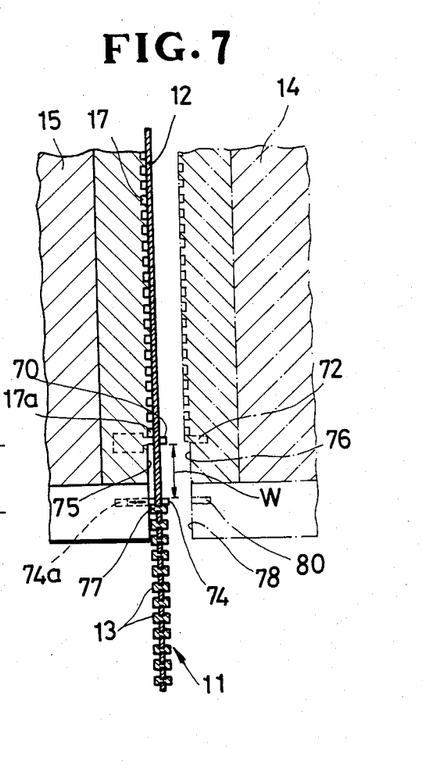
FIG. 7 is a fragmentary longitudinal cross-sectional view taken along line VII—VII of FIG. 6.
Figure 8:
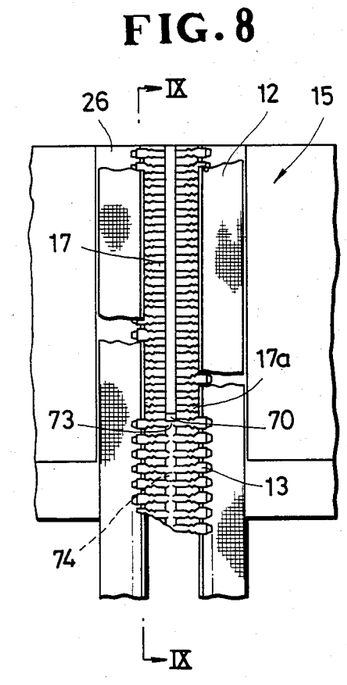
FIG. 8 is a view similar to FIG. 6, showing the manner in which a row of injection-molded coupling elements having a length several times as long as the length of a row of mold cavities is produced.
Figure 9:
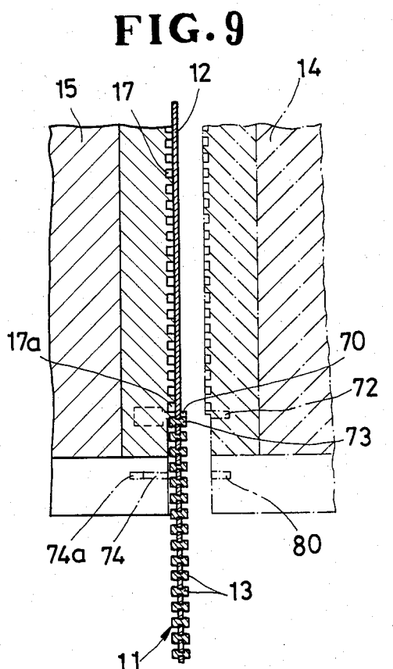
FIG. 9 is a longitudinal cross-sectional view taken along line IX—IX of FIG. 8.

In response to the completion of the retracting movement of the bases 31, 57 by the actuators 30, 56, the holding lever 47 is actuated to angularly move about the shaft 48 from the holding position (solid line) to the releasing position (phantom line), thereby allowing the support 43 and hence the tension roll 42 to move downwardly toward the base 31 by its own weight. Downward movement of the tension roll 42 causes the tape 12 to move in the reverse direction, during the time of which the drive roll 63 is reversely driven at such a speed that the tension roll 42 can apply a tension to the tape 12 between the braking device 50 and the drive and pinch rolls 63, 66. The reverse feeding of the tape 12 is stopped when the trailing end 73 of the injection-molded coupling elements 13 abuts against the feeler 74. At this time, the drive roll 63 ceases rotating in the reverse or clockwise direction. Thus one of successive portions of the stringer tape 12 is properly placed flatwise on the mold surface 26 of the movable mold member 15, as shown in FIGS. 6 and 7. In this position, the lowermost (leading) mold cavity 17a is spaced from the trailing end 73 of the injection-molded coupling elements 13 by a distance which is substantially the same as the distance W between the feelers 70, 74 and hence the same as the length l of the element-free portion 12a of the slide fastener stringer 11. Slightly thereafter or ideally at substantially the same time, the movable mold member 15 is brought into the fully closed position.

With this condition, melted synthetic resin material is injected into the mold cavities 17 in the mold members 14, 15 through the nozzle 22, a runner 91 and gates 92 (FIG. 6), to form a predetermined number of the coupling elements 13. The injection-molded coupling elements 13 are cooled for a predetermined period of time, during the time of which the bases 31, 57 of the tape shifters 24, 25 are moved by the actuators 30, 56 to the position of FIG. 2. In order to prevent the stringer tape 12 from being unduly stretched during the forward movement of the bases 31, 57, the drive roll 63 is reversely driven by a limited angle. An increased tension on the stringer tape 12 cause the tension roll 42 to move slightly upwardly.

Upon expiration of the predetermined cooling time, the movable mold member 15 is moved from the fully closed position to the fully opened position (FIG. 2), at which time the movable feeler 74 is retracted into the hole 74a and the injection-molded coupling elements 13 are ejected out of the mold cavities 17 by means of a plurality of ejector pins (not shown). Simultaneously with the ejecting of the injection-molded coupling elements 13, the brake lever 52 is pivotally moved from the locking position (solid line) to the releasing position (phantom line), thereby releasing the tape 12 from the locking engagement with the guide roll 51 and the brake shoe 53. At the same time, the drive roll 63 is driven to advance the stringer tape 12 for the predetermined distance until the trailing end 73 of the coupling elements 13 just molded is detected by the detector. The runner and gate portions 28, 27 (FIG. 6) are removed by the cutter 68 as the stringer tape 12 passes through between the drive and pinch rolls 63, 66, as shown in FIG. 2. The runner and gate portions 28, 27 thus removed fall into the hopper 29. The tension roll 42 is moved upwardly under an increased tape tension during the advancing movement of the tape 12. Upon stoppage of the tape's advancing movement, the holding lever 47 holds the tension roll 42 in the raised position and the braking device 50 locks the stringer tape 12. Thus, one cycle of operation for one of successive portions of the stringer tape 12 has been completed. The same operation is repeated for succeeding portions of the stringer tape 12 until the slide fastener stringer 11 shown in FIG. 10 is produced. The length of each row of injection-molded coupling elements 13 can be changed by an adjusting rod 93 which is received in the runner 91 and movable for adjusting a distance d (FIG. 6) to block the flow of the melted synthetic resin material into a group of mold cavities 17.

The slide fastener stringer 11 shown in FIG. 11 can be produced by interlocking or coordinating the movable feeler 74 with the drive roll 63 such that the feeler 74 projects from the guide surface 77 only when the stringer tape 12 has been advanced by a distance, several times as long as the distance as done for the FIG. 10 embodiment, by controlling the drive roll 63 to repeat the predetermined number of revolutions.

To manufacture the slide fastener stringer 11 of FIG. 11, the apparatus 10 operates in a manner which is similar to the manner as described with reference to the embodiment of FIG. 10, but which differs therefrom in that the movable feeler 74 is still retracted in the hole 74a even when the advancing movement of the stringer tape 12 is stopped with the trailing end 73 of the previous, injection-molded coupling elements 13 disposed slightly beyond the hole 74a upon completion of the drive roll's predetermined number of revolutions (FIG. 2); and the stringer tape 12 is fed in the reverse direction jointly by the drive roll 63 and the tension roll 42 until the trailing end 73 of the injection-molded coupling elements 13 abuts against the fixed feeler 70. While the mold members 14, 15 are closed, melted synthetic resin material is injectied into the mold cavities 17 to form a row of coupling elements 13 having a length l which is the same as the length l of the one shown in FIG. 10 at 13. These steps are repeated until the row of injection-molded coupling elements has the lengh L' of FIG. 11. Then the movable feeler 74 is actuated to project from the guide surface 77 to engage the trailing end 73 of the injection-molded coupling elements 13, thereby stopping the reverse movement of the stringer tape 12. After melted synthetic resin material has been injected into the mold cavities 17, an element-free portion 12a (FIG. 11) is formed between the previous injection-molded coupling elements 13 and a just injection-molded coupling element 13. Thus, one cycle of operation for one of successive portions of the stringer tape 12 has been completed. The same operation is repeated for a succeeding portion of the stringer tape 12.

The length of each row of injection-molded coupling elements 13, 13' can be changed by simply selecting the number of repetitions of the feed of the stringer tape 12.

According to the apparatus 10, it is possible to manufacture a slide fastener stringer having a continuous row of injection-molded coupling elements secured to a stringer tape along a longitudinal edge thereof by continuously holding the movable feeler 74 in its retracted position. The coupling elements thus molded have a uniform element pitch throughout the length thereof. The feelers 70, 74 may be disposed on the fixed mold member 14. With the movable feeler 74 disposed downstream of the fixed feeler 70 at a distance W, the length of the element-free portions 12a between the successive rows of the coupling elements 13, 13' is always constant. The slide fastener stringer 11 having such even element-free portions 12a can be processed properly in succeeding process such as end-stop application, automatic pairing with a mating stringer, and severing.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. An apparatus for manufacturing a continuous slide fastener stringer including a continuous stringer tape and a plurality of longitudinally spaced rows of injection-molded coupling elements secured to the stringer tape along a longitudinal edge thereof with a plurality of element-free portions between the successive rows of injection-molded coupling elements, said apparatus comprising:

(a) a frame;
  (b) a pair of relatively movable mold members supported on said frame and defining a series of mold cavities, said mold members having a pair of mating mold surfaces, respectively, (c) a power-driven feed mechanism for intermittently feeding the stringer tape by a predetermined length;

(d) a first feeler disposed on one of said mold members adjacent to a leading one of said mold cavities and projecting from the mold surface of said one mold member toward said mold surface of the other mold member for detecting a trailing end of the injection-molded coupling elements;

(e) a second feeler movably disposed on said one mold member downstream of said first feeler for detecting the trailing end of the row of injection-molded coupling elements, said second feeler being spaced from said first feeler by a distance substantially the same as the length of the element-free portions and being movable to project and retract from the mold surface of said one mold member; and (f) a driving mechanism operatively connected to said feed mechanism for driving said second feeler to selectively project or retract from the mold surface of said one mold member in response to completion of the feed of the stringer tape by said feed mechanism.

2. An apparatus according to claim 1, said other mold member being fixedly supported on said frame, said one mold member being movably supported on said frame and movable toward and away from said fixed other mold member.

3. An apparatus according to claim 1, said one mold member having a hole extending perpendicularly to said mold surface, said second feeler being completely receivable in said hole and having a pin extending perpendicularly therefrom, said driving mechanism comprising a cam chamber extending in said one mold member across said hole, a cylinder bore communicating at one end with said cam chamber, a slide block movably received in said cam chamber and having an obliquely extending elongate slot in which said pin is movably received, a piston movably received in said cylinder bore and connected at one end to said slide block, and a compression spring received in said cam chamber remotely from said piston and urging said slide block toward said cylinder bore, and means for supplying a pressurized fluid into said cylinder bore to move said piston, and hence move said slide block away from said cylinder bore against the bias of said compression spring.

* * * * *